Dec. 14, 1971  R. KOTLER  3,626,734
BAR COILER

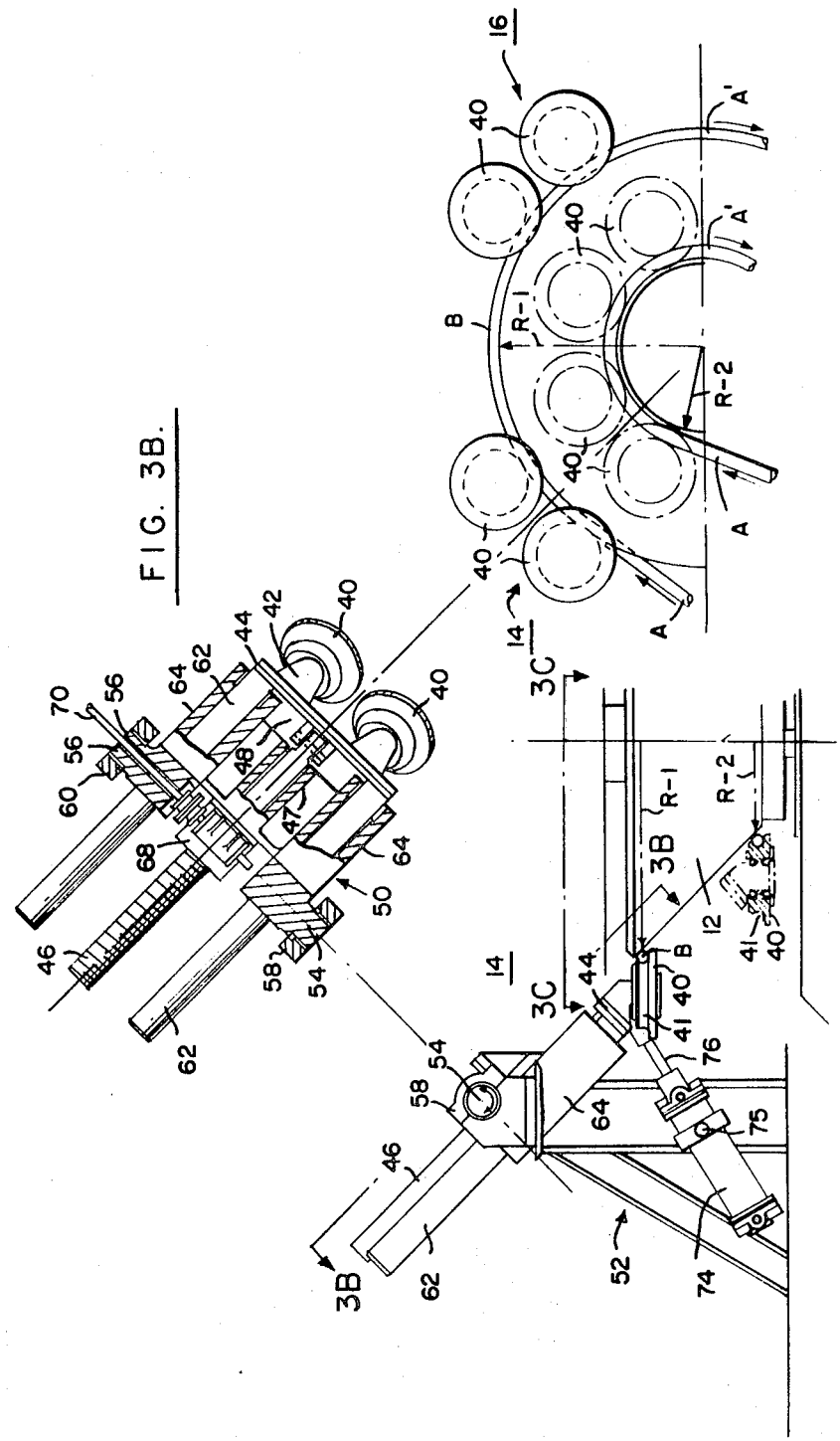

Filed June 10, 1970  4 Sheets-Sheet 4

INVENTOR
RICHARD KOTLER

BY
Smith, Harding,
Earley + Follmer
ATTORNEYS

United States Patent Office 3,626,734
Patented Dec. 14, 1971

3,626,734
BAR COILER
Richard Kotler, Monroeville, Pa., assignor to Blaw-Knox
Foundry & Mill Machinery, Inc., Pittsburgh, Pa.
Filed June 10, 1970, Ser. No. 44,917
Int. Cl. B21d 7/04; B21f 3/04
U.S. Cl. 72—139                        13 Claims

ABSTRACT OF THE DISCLOSURE

A machine for the coiling of bars including a rotating mandrel having a conical surface and means for holding the bar being coiled against said surface for a substantial arc so as to bend the bar to form the coil. As the bar is being fed through the coiler, the holding means is moved axially back and forth along the conical surface to progressively vary the radius of curvature of the bar as it is being formed.

BACKGROUND OF THE INVENTION

Invention relates to machines for forming heavy rods or bars into coils, which machines are known as bar coilers.

Bar coilers of the indicated type receive a bar which is fed thereto in a straight condition and form the bar into some form of coil-like configuration.

The trend in the art is to coil heavier material. However, since this material must be bent forcefully and laid in an orderly spiral, the machines in accordance with the prior art are unsatisfactory because they are unable to produce the necessary bending forces for heavy material, such as for example, one inch diameter cold steel or two inch diameter hot steel.

SUMMARY OF THE INVENTION

It is the object of this invention to provide for the coiling of bars of heavy stock.

Briefly stated, the machine in accordance with the invention achieves the above objective by providing a rotating mandrel, such as a conical drum, which provides a bar contacting and forming surface varying progressively from a large radius of curvature to a smaller radius of curvature, means for forcefully confining the bar to the surface of the mandrel for a considerable arc, said last-named means being moved progressively from a location on the drum having a large radius of curvature to a location on the drum having a smaller radius of curvature to form the coil progressively into varying radii of curvature, and means for receiving the coiled bar and supporting it in a coil-like configuration.

BRIEF DESCRIPTION OF THE DRAWINGS

FIG. 3A is a fragmentary view of a detail;

FIG. 3B is a view taken generally on line 3B—3B of FIG. 3A and positioned accurately relative to a projection line from FIG. 3A;

FIG. 3C is a diagrammatic view taken generally on line 3C—3C of FIG. 3A and positioned accurately relative to a projection line from FIG. 3B;

DESCRIPTION OF THE PREFERRED EMBODIMENT

The bar coiler in accordance with the invention comprises means for receiving and forcefully bending a bar to a desired curvature. To this end there is provided a mandrel means 10, which includes a conical drum 12, for supporting the bar "B" during the bending operation and a pair of roller assemblies 14 and 16 spaced circumferentially about the drum 12 for holding the bar against the drum at the circumferentially spaced locations thereof.

Figure 1:
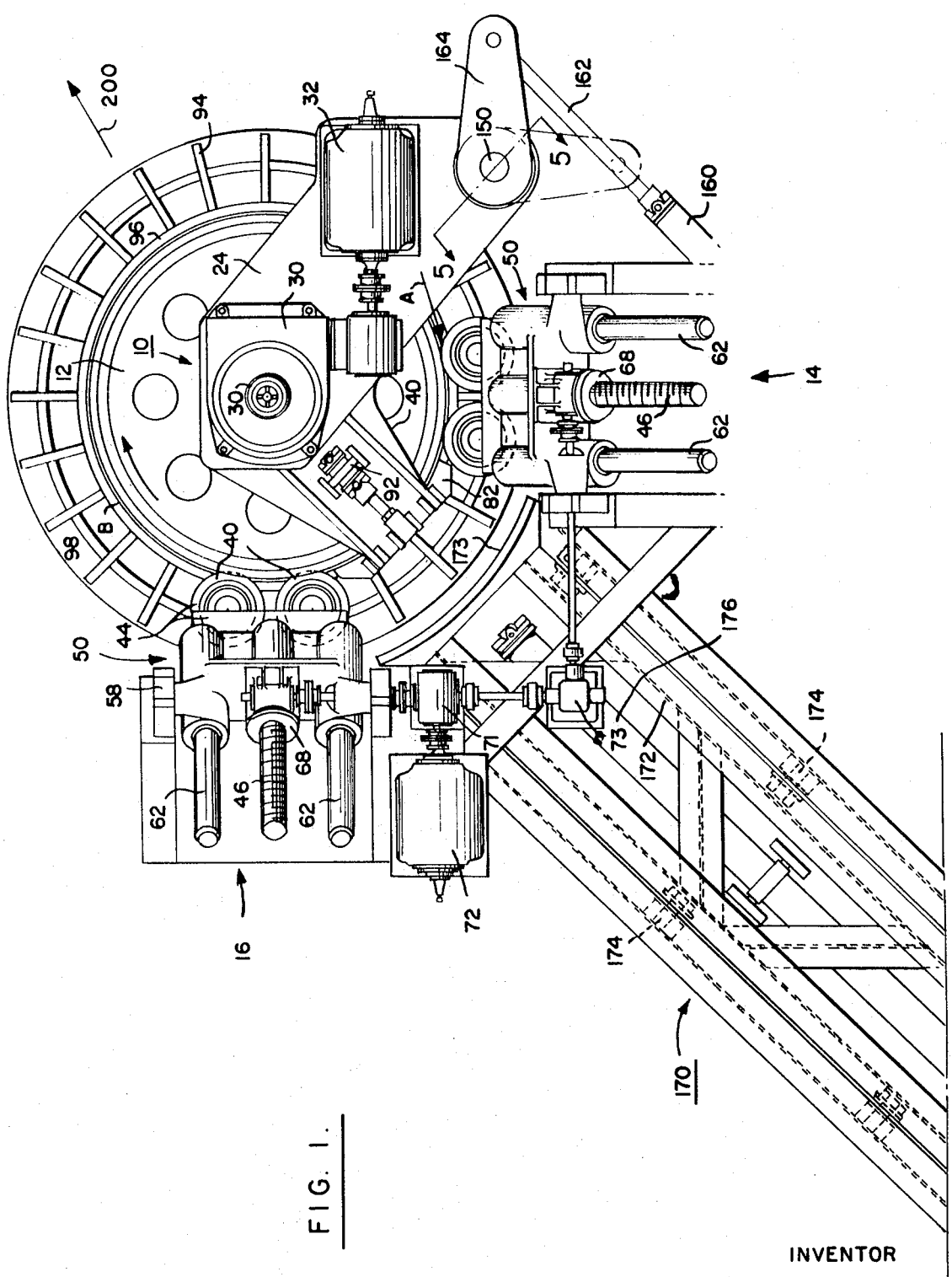
FIG. 1 is a plan view of a bar coiler in accordance with the invention.
Figure 2:
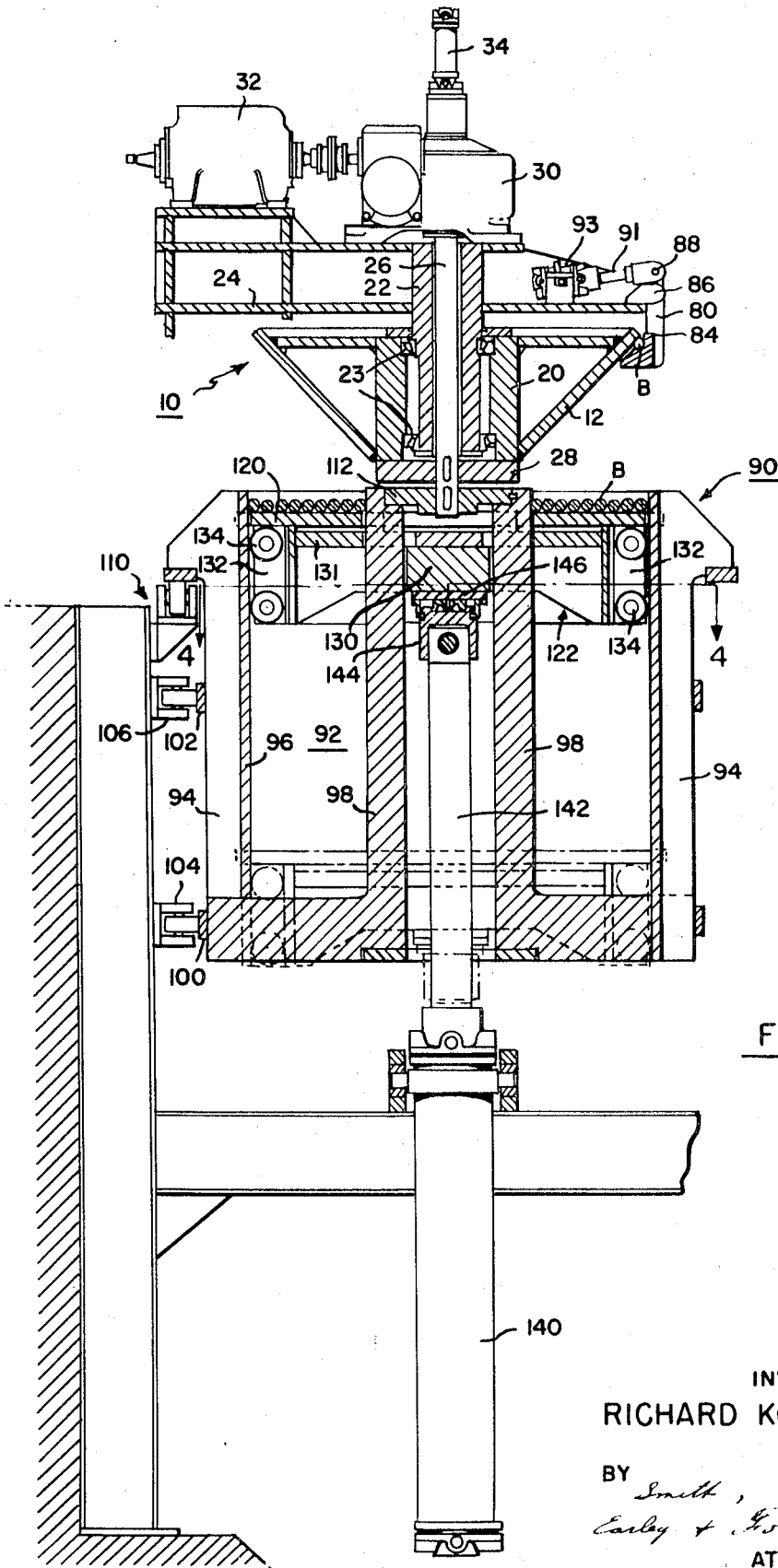
FIG. 2 is an elevational sectional view of the bar coiler shown in FIG. 1.

As is best shown in FIG. 2, the drum 12 is rotatably supported at a hollow cylindrical central portion 20 which is carried on a cylindrical member 22 by a suitable thrust bearing means 23. Member 22 is supported on and extends downwardly from a horizontal frame indicated generally at 24. The frame 24 also supports the drive means for the rotatable drum 12, which means comprises a drive shaft 26 which extends within a central bore in member 22 and is keyed to a plate 28 secured to the lower end of drum portion 20. The drive shaft 26 is driven by means of a gearing unit 30 driven by a suitable motor 32. For a purpose to be described hereafter, the drive shaft 26 is adapted to be moved axially by means of an air cylinder 34. As shown by the arrow in FIG. 1, drum 12 is driven in a clockwise direction.

The roller assemblies 14 and 16 are essentially identical wherefore corresponding parts will be given the same reference numerals.

Each of the roller assemblies 14 and 16 comprises a pair of bar engaging rollers 40 which are rotatably mounted on a pair of extensions 42 of a roller supporting member 44. The member 44 is carried on the end of a screw member 46 by means of a pin-type connection indicated generally at 48 (FIG. 3B). The screw 46 is contained within a cylindrical portion 47 of a pivoted housing indicated generally at 50. The housing 50 is pivoted on a fixed frame 52 at a pair of pivot extensions 54 and 56. The pivot extensions 54 and 56 are mounted in position on the frame 52 by a pair of cap members 58 and 60, respectively. The roller supporting member 44 is also supported on the ends of the pair of guide rods 62 which extend within a pair of hollow cylindrical portions 64 of the housing 50 as is best shown in FIG. 3B. The axes of guide rods 62 and screw 46 are parallel.

The screw 46 of the roller assembly is the screw extended from a suitable screw jack assembly 68 which is mounted on the frame 50 and driven by a drive shaft 70 from a suitable reversible motor 72. Screw jack assembly 68 of roller assembly 16 is driven by way of drive gear unit 71, while screw jack assembly 68 of roller assembly 14 is driven by way of drive gear units 71 and 73 also by motor 72 as is apparent from FIG. 1.

It will be apparent that when the screw jack assemblies 68 are actuated in the proper direction by motor 72 that each screw 46 can be moved to be extended progressively outward from retracted position shown in FIGS. 3A and 3B. Each screw 46 may be extended from the location adjacent to the upper, larger diameter position of drum 12 to the location adjacent the lower, smaller diameter position of drum 12 which positions are shown in full and dashed lines in FIG. 3A. When the screws 46 reach the end of travel in either direction, motor 72 is reversed, thus reversing the direction of screw travel. This is achieved by a suitable control such as are well known. Thus the screws 46 serve to move the rollers 40 continuously back and forth between the full and dotted line positions shown in FIG. 3A. The guide rods 62 serve to guide the rollers 40 during this movement.

Means are provided for forcefully urging the rollers 40 towards the conical surface of the drum 12 at all times during the movement along this surface as described above. To this end, there is provided a hydraulic cylinder 74 which is pivotally mounted on the frame 52 at pivot 75 and has its actuator arm 76 connected to the roller supporting member 44. The hydraulic cylinder 74 is constructed to urge the actuator arm 76 outwardly at all times. Thus, by reason of the arrangement of the parts as shown in FIG. 3A, the cylinder 74 constantly urges the rollers 40 toward the conical surface of drum 12. Because of the pivotal mounting of the cylinder 74 at pivot 75, it will be apparent that the cylinder 74 will pivot to accommodate the movement of the rollers between the positions shown in FIG. 3A.

The rollers 40 are each provided with a groove 41 extending around the periphery thereof and shaped to conform to the bar "B" as is shown in FIG. 3A. As will be described hereafter, the bar B is fed between the groove 41 and the surface of drum 12. Accordingly, the combined action of the screws 46 and cylinders 74 on the rollers 40 is such that the rollers 40 forcefully hold the bar B against the conical surface of drum 12 at the circumferentially spaced locations of roller assemblies 14 and 16 to bend the bar in an arc having a radius of curvature corresponding to that of the contacted drum portion. This radius of curvature will vary progressively as the rollers are moved between the positions described above and shown in FIGS. 3A and 3C. In FIGS. 3A and 3C there is shown the maximum and minimum radii of curvature R-1 and R-2, respectively, into which the bar B will be bent. Of course, the bar B will be bent progressively into intermediate radii of curvature as the rollers 40 are moved between their upper and lower positions whereby a coil will be formed comprising a plurality of spiral layers (FIG. 2).

It will be evident that the parts are designed so that the bending of the bar B is beyond its elastic limit so that a permanent bending action takes place.

As shown in FIG. 3C, the bar is fed into the machine at roller assembly 14 in the direction indicated by arrow "A." The bar then passes with the drum 12 in the direction of its rotation to the roller assembly 16 from which it is fed in the direction of arrow "A" from the machine. The speed of feed of the bar to the coiler is controlled by the preceding operation (for example, it may be the speed at which the bar is delivered from a rolling mill). By means of a suitable control, the drum speed is controlled to match the bar speed.

While the circumferentially spaced roller assemblies 14 and 16 will adequately handle a bar once it has been inserted in the machine and positioned between both pairs of rollers 40, it will be apparent that when the bar is initially inserted into the machine, means are required to feed the forward end of the bar between the rollers 40 of each roller assembly. Accordingly, there is provided means which serves to guide the forward end of the bar from roller assembly 14 (which receives the bar first) to the roller assembly 16. Such means is best shown in FIGS. 1 and 2 and comprises a pivoted arm 80 which carries a bar engaging member 82 at its lower end. Member 82 is adapted to provide an arcuate trough 84 conforming generally to the shape of the rod and having a radius of curvature concentric with the upper end of the conical drum 12. Arm 80 is pivoted at pivot 86 and extends upwardly therefrom to a connection 88 on the extended end of the actuator arm 91 of an air cylinder 93. It will be apparent that when the air cylinder is operated to extend the actuator arm 91 to the position shown in FIGS. 1 and 2, the member 82 will be positioned adjacent conical surface at the upper end of the drum 12. When the parts are actuated to this position the forward end of a bar will pass from the rollers 40 of roller assembly 14 into the trough 84 and from the trough 84 into the rollers 40 of the roller assembly 16. In this manner the mechanism serves to guide the front end of the bar from roller assembly 14 to roller assembly 16. As soon as this is accomplished, the air cylinder is actuated to retract the arm 91 and pivot the arm 80 in a counterclockwise direction above pivot 86 to withdraw the member 82 from its position adjacent the drum 12 and to a position out of contact with the bar being fed to the coiler. Thus, the mechanism 80 is only operative during the initial bar coiling operation.

Means are provided for receiving and supporting the coil as it is formed to the various radii of curvature described above. This means is best shown in FIG. 2 and comprises a generally cylindrical container 90 which is open at its upper end and which defines a generally annular compartment 92 therein. The compartment 92 is open at its upper end adjacent the conical drum 12.

The coil receiving container 90 is constructed of a plurality of vertically extending members 94 secured to four arcuate segments 96 (FIG. 4) mounted on horizontally extending portions of four fingers 98. At their radially outer ends the members 94 are held by a pair of vertically spaced bands 100 and 102. The container structure is supported on bearing supports, indicated at 110 in FIG. 2, which are spaced circumferentially about the container 90. There is also provided suitable lateral bearing supports such as those shown in FIG. 2 at 104 and 106, which bearing supports are also spaced circumferentially around the container 90. All the parts 94-102 described above are welded or otherwise secured together to form a unitary structure supported on the bearings 110 and guided by the bearings 104 and 106.

It will thus be apparent that the container construction provides an annular coil receiving compartment 92 which has an inner portion defined by the outer edge of the vertical portion of the fingers 98 and an outer periphery defined by the arcuate members 96.

At their upper ends, the fingers 98 are secured together by a plate 112 which is adapted to be drivingly connected to the lower end of the shaft 26 by a suitable key means. It will thus be apparent that the container 90 is driven conjointly with the drum 12 since they are both driven by the same drive shaft 26.

It will also be noted that the compartment 92 conforms generally to the size of the drum 12 so that it will receive the coils which are formed on the drum 12 and released to fall by gravity into the compartment 92.

Figure 4:
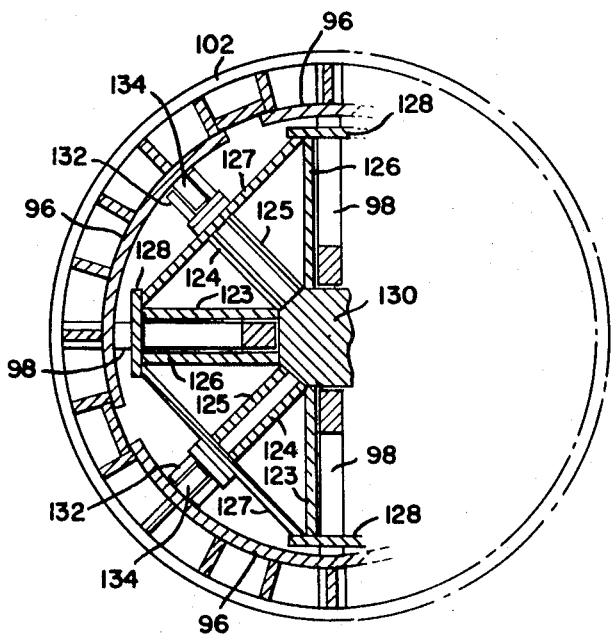
FIG. 4 is a section taken generally on line 4—4 of FIG. 2.

Means are provided within the compartment 92 to support the coil as it is delivered thereto from the coil forming drum 12. Such means comprises an annular platform 120 which is supported by a movable roller means 122. The roller means 122 is constructed of a plurality of interconnected plates 123-128 with the generally radially extending plates 123-126 being connected to a center block 130 as is shown in FIG. 4. The plates 123-128 and block 130 are also fastened to a support member 131. With this construction there are provided four plates 127 which extend generally in the direction of a chord of the circle defined by the arcuate plates 96. These plates 127 support vertically extending plates 132 which support a pair of vertically spaced rollers 134, the rollers 134 being arranged to contact the inner wall of the arcuate plates 96. It will thus be apparent that the roller assembly 122 is capable of moving vertically within the compartment 92 and the uppermost and lowermost positions which the roller assembly may take are shown in full and dashed lines in FIG. 2.

Means are provided for supporting the roller assembly 122 as it is moved between the upper and lower positions described above. Such means comprises a hydraulic cylinder 140 which has an actuator arm 142 extending vertically upwardly within the vertical portions of fingers 98. At the upper end of arm 142 there is supported a bolck member 144 which carries a suitable bearing means 146 which rotatably supports the center block 130 of the roller means 122.

The hydraulic cylinder 140 is adapted to normally bias the roller means 122 upwardly but may be actuated to retract the arm 142 to lower the assembly as the coil is deposited onto the platform 120. The hydraulic cylinder may be also actuated upwardly to push the roller assembly 122 and the platform 120 from the lowermost position to the uppermost position when the coil has been completely formed and it is desired to remove the formed coil from the machine.

Figure 5:
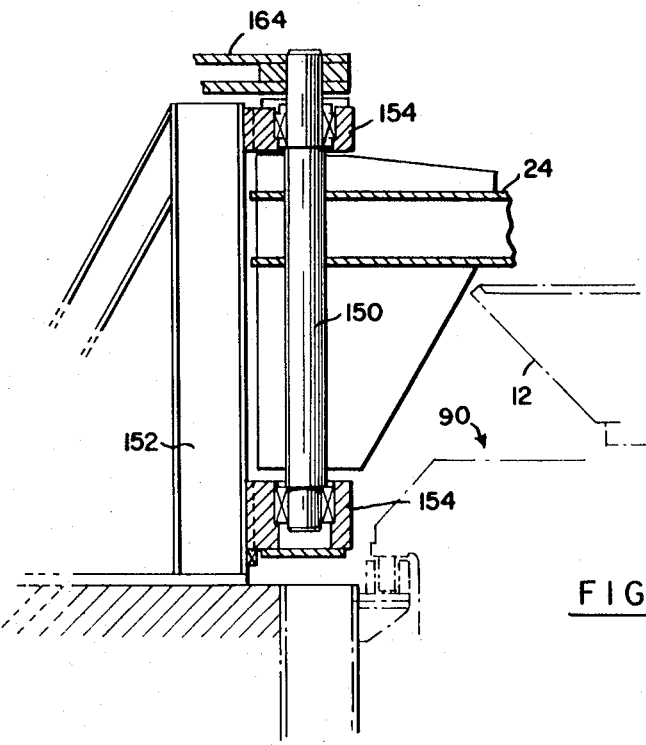
FIG. 5 is a section taken generally on line 5—5 of FIG. 1.

The mandrel means 10 is mounted so that it can be moved from the operative position shown in FIG. 1 to a position clear of the container 90 to permit the removal of a completed coil as will be described hereafter. To this end, the frame structure 24 is mounted on a vertically extending pivot rod 150. The pivot rod 150 is suitably supported on a fixed frame 152 by means of suitable bearing supporting structures 154. As is shown in FIG. 5, the frame 24 is pivotally supported on the rod 150 in a manner to pivot with the rod 150.

Means are provided for turning the rod 150. Such means comprises a hydraulic cylinder 160 (FIG. 1) which has its actuator arm 162 connected at its outer end to a crank arm 164 which is secured to the upper end of the rod 150 (FIG. 5). By this arrangement, the hydraulic cylinder may be actuated to cause a turning movement of the rod 150 and the frame 24 carried thereby.

Means are provided for disconnecting the rotational tie between mandrel assembly 10 and container 90, the tie being in the form of drive shaft 26. Such means includes the hydraulic cylinder 34 which has its body mounted onto drive gear case 30 and its actuator arm connected to drive shaft 26 (FIG. 1). By this arrangement the hydraulic cylinder may be actuated to cause drive shaft 26 to be retracted from its engagement with plate 112, thus allowing mandrel assembly 10 to be moved as described below.

In FIG. 1, the frame 24 is shown in a position supporting the mandrel assembly 10 in its operating position directly above the container 90. When it is desired to remove a completed coil from the container 90, the cylinder 160 is actuated to retract its arm 162 and cause the crank 164 to pivot in a counterclockwise direction about the axis of rod 150 to the dotted position shown in FIG. 1. This causes a corresponding movement of the frame 24 which will move in a counterclockwise direction about the axis of pin 150 which is rotated by the crank arm 164. By this action of the cylinder 160, the entire mandrel assembly 10 will be moved to be clear of the container 90.

Means are provided for pushing a completed coil from the machine, such means comprising a coil pusher assembly 170 positioned adjacent the upper end of the container 90 at a location shown in FIG. 1. The pusher assembly comprises a ram 172 which carries a pusher head 173 at its forward end and is supported on a plurality of wheels 174 spaced along the longitudinal axis of the ram. The ram 172 is actuated by a suitable hydraulic cylinder 176 which is connected to the ram. The parts are constructed so that the cylinder 176 may be actuated to cause the ram 172 to move from the position shown in FIG. 1 toward the center of the machine and across the upper end of the container 90 to thereby remove any coil that had been positioned in its path.

The machine is thus constructed to automatically remove a completed coil from the machine. In describing this operation let it be assumed that the completed coil has moved the roller assembly 122 to the lowermost position shown in dotted lines in FIG. 2. The first step in the coil removal operation is to actuate the hydraulic cylinder 34 to retract its rod and thereby disconnect drive shaft 26 from its engagement with plate 112. Next in the operation is to actuate the hydraulic cylinder 160 to retract its rod 162 and thereby move the frame and the mandrel assembly 10 clear of the upper end of the container 90. The hydraulic cylinder 140 is then actuated to cause its rod 142 to move upwardly to position the roller means 122 and platform 120 to a position above the upper end of the container 90. Finally, the cylinder 176 is actuated to cause the pusher head 170 to move across the upper end of the container 90 and thereby move the completed coil in the direction of the arrow 200 in FIG. 1 to a suitable coil removing means.

It will be apparent that this coil removing procedure may be accomplished quite rapidly. Accordingly, the machine is quickly adapted to receive a new bar so that the above-described coiling procedure may be repeated.

It will be understood that the above description is illustrative and that changes may be made in the construction and arrangement of parts without departing from the scope of the invention and defined by the following claims.

I claim:

1. A bar coiler comprising means providing a rotating mandrel having a bar contacting and forming surface varying progressively from a large radius to a smaller radius of curvature, means for forcefully holding and confining a bar against the surface of said rotating mandrel for a considerable arc, said last-named means being moved progressively back and forth from a position adjacent the surface of said rotating mandrel having the large radius of curvature to a position adjacent said mandrel surface having the smaller radius of curvature to form the bar progressively into a coil having varying radii of curvature, and means for receiving the coiled bar and supporting it in its coiled configuration.

2. A bar coiler according to claim 1 wherein said bar holding means comprises a pair of roller assemblies having rollers, each roller being adapted to receive and hold at its periphery a bar in contact with said surface.

3. A bar coiler according to claim 1 wherein said rotating mandrel comprises a conical drum providing a conical bar contacting surface.

4. A bar coiler according to claim 3 wherein said bar holding means comprises a pair of roller assemblies having rollers, each roller being adapted to receive and hold at its periphery a bar in contact with said mandrel surface.

5. A bar coiler according to claim 4 wherein said bar holding means includes means for moving said rollers progressively between a position wherein the bar contacts the conical surface at a maximum radius of curvature and a second position in which said bar contacts the conical surface at a minimum radius of curvature whereby the coil is formed by a plurality of spiral layers.

6. A bar coiler comprising a rotating mandrel means providing a conical surface for contacting and supporting a bar during a bar coiling operation, said conical surface providing a plurality of radii of curvature, a first and a second roller assembly positioned adjacent said conical surface, each roller assembly including a roller means adapted to support a bar on said mandrel surface, means to urge said roller means forcefully against said surface, and means for moving said roller means axially along said conical surface back and forth between a large radius of curvature position and a smaller radius of curvature position, said second roller assembly being positioned adjacent said conical surface and spaced circumferentially from said first roller assembly, means for operating said roller moving means for each roller so that a bar fed to said roller means is bent into progressively different radii of curvature as the coil moves back and forth between said large and smaller positions to thereby form a coil, and means for receiving and supporting the bent bar as it passes from said second roller and supporting the coil being formed.

7. A bar coiler according to claim 6 comprising means for guiding the forward end of a bar fed to said first roller assembly therefrom to said second roller assembly, said guide means having an arcuate trough for holding and receiving a bar against the conical surface.

8. A bar coiler according to claim 7 wherein said trough forming means is adapted to be moved out of said bar guiding position away from the surface of of said drum.

9. A bar coiler according to claim 6 wherein said means for receiving and supporting the coil formed comprises a rotating container having a generally annular coil receiving compartment adjacent said conical drum.

10. A bar coiler according to claim 9 wherein said means for receiving and supporting the coil includes a platform movable within said compartment to support the coil as it is received therein.

11. A bar coiler according to claim 10 including means for moving said platform to a position above the coil receiving end of said compartment.

12. A bar coiler according to claim 9 including means for moving said rotating mandrel means from the position adjacent said rotating container to a position clear thereof.

13. A bar coiler according to claim 12 including power operated means for pushing a coil from said platform when said platform is in said position above the coil receiving end of said container.

References Cited

UNITED STATES PATENTS

| | | | |
|---|---|---|---|
| 24,557 | 6/1859 | Harrison, Jr. | 72—139 |
| 3,145,760 | 8/1964 | Brautigam | 72—138 |

FOREIGN PATENTS

| | | | |
|---|---|---|---|
| 1,250,778 | 9/1967 | Germany | 72—138 |

LOWELL A. LARSON, Primary Examiner

U.S. Cl. X.R.

242—82